No. 657,181. Patented Sept. 4, 1900.
H. DE RAASLOFF.
PROCESS OF SEPARATING PRECIOUS METALS FROM THEIR ORES.
(Application filed Jan. 18, 1900.)
(No Model.) 3 Sheets—Sheet 1.
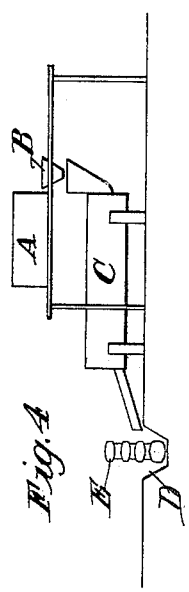
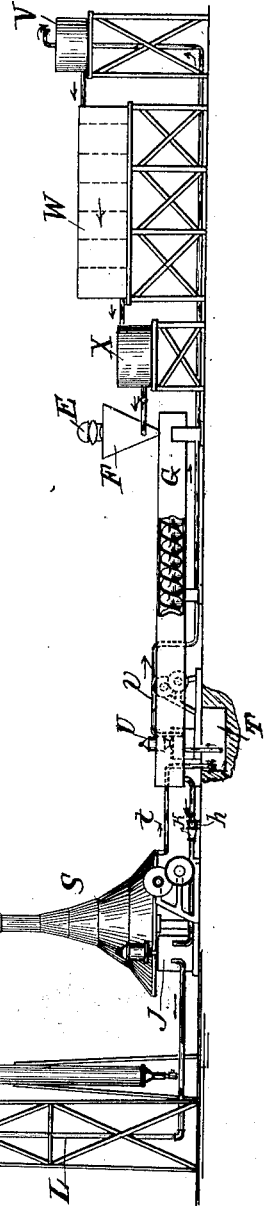
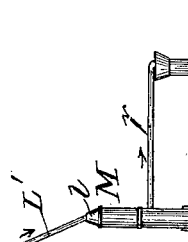
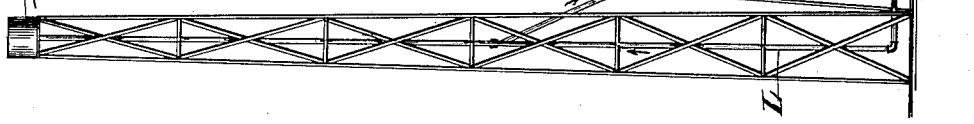
WITNESSES:
Geo. B Rowley.
Henry N. Brown.
INVENTOR
Harald de Raasloff
BY
D. Walter Brown
ATTORNEY

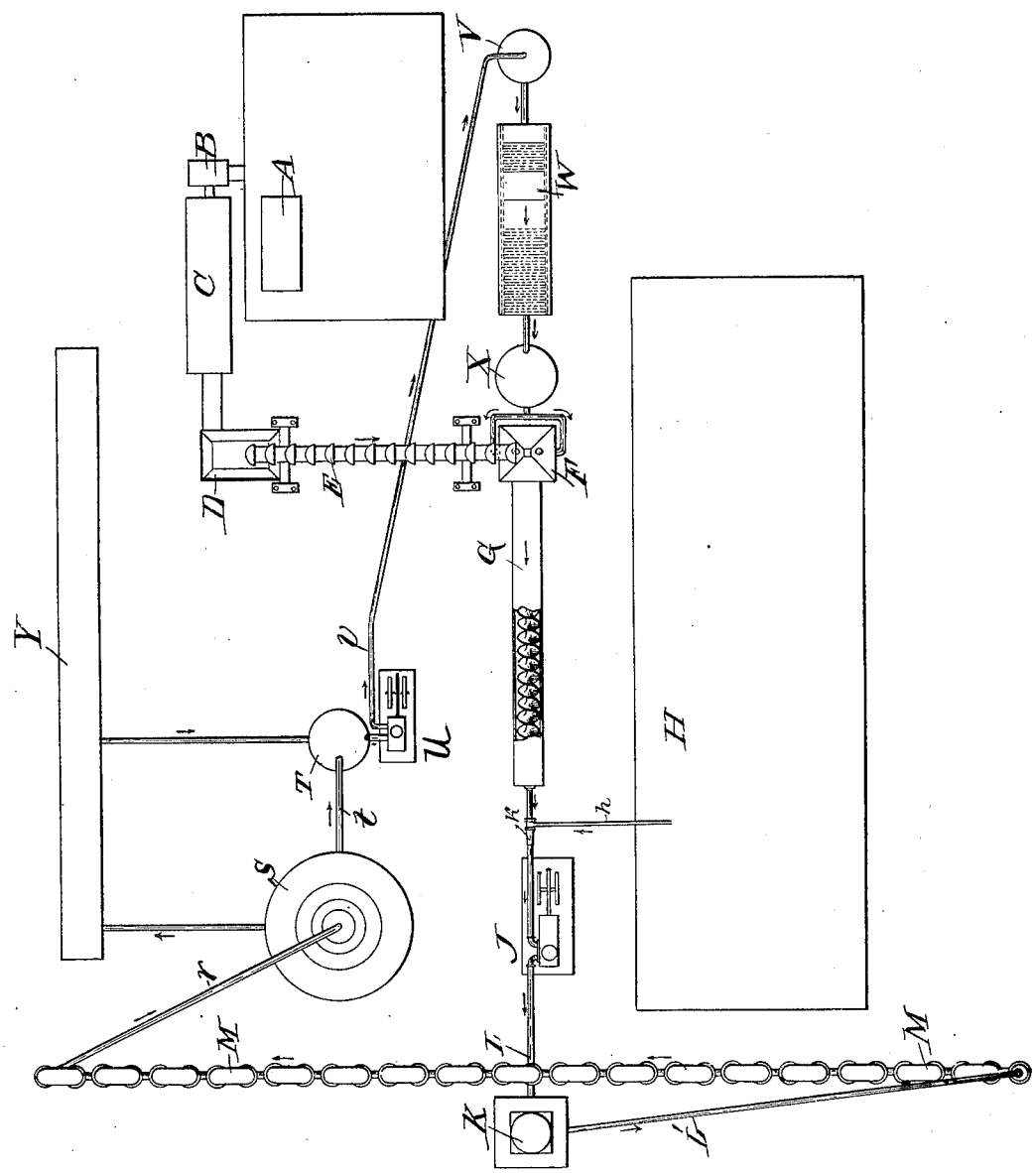

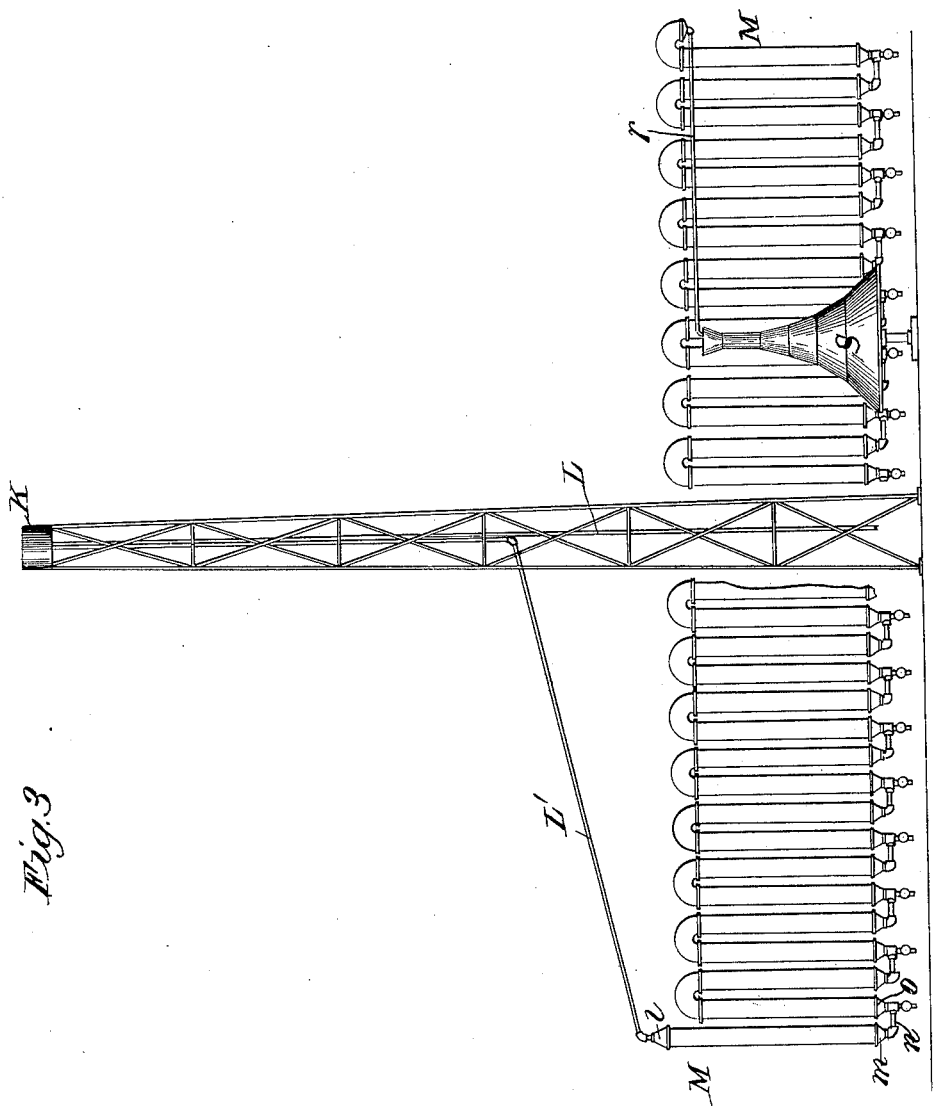

UNITED STATES PATENT OFFICE.

HARALD DE RAASLOFF, OF NEW YORK, N. Y.

PROCESS OF SEPARATING PRECIOUS METALS FROM THEIR ORES.

SPECIFICATION forming part of Letters Patent No. 657,181, dated September 4, 1900.

Application filed January 18, 1900. Serial No. 1,836. (No specimens.)

*To all whom it may concern:*

Be it known that I, HARALD DE RAASLOFF, a citizen of the United States, residing at the city of New York, borough of Manhattan, in the county and State of New York, have invented new and useful Improvements in Processes of Separating Precious Metals from Their Ores, of which the following is a specification.

This invention relates to a process of separating precious metals from their ores.

In particular the invention relates to a continuous process wherein the finely-ground ore mixed with the solvent for the precious metal is maintained in continuous circulation through the apparatus, thereby being subjected to the various steps of the process in continuous ordered succession, and especially it relates to such a continuous process wherein one of the steps is the introduction of liquid oxygen, (or liquefied air to generate the oxygen,) another of the steps being the gravity agitation and mixing of the powdered ore, solvent, and oxygen, and another the electrochemical deposition of the precious metal from the solution.

The process is independent of any particular elements, construction, or combination of apparatus; but in order to the more clearly exhibit how the process is operated I hereinafter describe it in connection with certain apparatus the parts of which are described and claimed in other of my applications for patents.

Referring to the drawings which accompany the specification to aid the description, Figure 1 is a schematic representation of a plant for operating my process in side elevation, but with the shell of the conveyer-mixer partly broken away. Fig. 2 is a schematic plan view of the plant. Fig. 3 is an elevation, partly broken, of the agitator-extractor and separator-filter as seen from the right of Fig. 1, certain other parts being omitted for sake of clearness. Fig. 4 is an elevation of a crusher, tube-mill, and bucket conveyer to transport the ground ore to the conveyer-mixer.

In working the process the finely-ground ore (assuming it to be gold-bearing ore) is mixed with properly-diluted potassium cyanid, the ore, if acid, being neutralized by a suitable alkaline material, as lime, which is ground up with the ore. Into the mixed ore and cyanid or "pulp" is then admitted liquid oxygen or liquefied air to generate the oxygen, and the whole is then agitated, and preferably by my improved gravity agitator-extractor, for a sufficient length of time to allow the cyanogen, aided by the oxygen, to dissolve practically all the gold from the ore. The whole is then filtered or subjected to some other separation process whereby the liquid containing the gold in solution is separated from the earthy mineral matter. Then the liquid is sent through an electrodepositing-bath, where the gold is deposited on the cathodes, the liquid, which still contains more or less gold not extracted in the bath, then receiving additional cyanid solution and an additional charge of ore and then again going through the same round of treatment, and so on in continuous succession until the cathodes have received the requisite deposit of gold, when they are removed from the bath, other plates being inserted in their stead, and the gold obtained by any usual means.

In connection with the apparatus shown on the aforesaid drawings the above process is operated in the following manner: From the crusher A the ore goes by the usual chute to the hopper B, and thence to the tube-mill C, where it is finely ground. Thence it is discharged into the hopper or receptacle D, from which it is elevated by the bucket conveyer E to the hopper F, whence it is regularly and continuously discharged into the conveyer-mixer G, which is here shown as a worm turning in a cylindrical shell and driven by any suitable motor. Here the powder is mixed with dilute cyanid solution, which flows into the conveyer-mixer G from the vat X and is thoroughly mixed with the powdered ore by the worm. From the said conveyer-mixer the pulp, sucked and forced by the pump J, is elevated through pipe L to a tank K, placed at a suitable elevation. As the pulp flows through pipe L it draws in at the injector $k$ liquid oxygen or liquefied air from the generator H by pipe $h$. In place of the liquid oxygen or of the liquefied air as a source of oxygen I can of course use other producers of oxygen, as peroxid of hydrogen; but I prefer to introduce liquid oxygen obtained by evaporating nitrogen from liquid air, as explained in my application for United States Letters Patent, filed August 9, 1899, Serial No. 726,661. From the tank K, which is preferably closed at the top and operates as an air-cushion as well as receptacle for the pulp and so as to overcome the pulsations of the pump J, the pulp, with the oxygen, descends by pipe L' to the first pipe or member of the gravity agitator-extractor M, which it enters through the expander $l$. Flowing downward comparatively slowly through this pipe the mixture passes through the reducer $m$ and pipe $n$ to the expander $o$, thence slowly upward through the second member of the agitator-extractor, through the return-bend at the top, slowly downward through the next member of the agitator-extractor, then again through a reducer, short pipe, and expander to the bottom of the next member of the agitator-extractor, and so on, alternately flowing upward and downward and experiencing a sudden change first from a lower to a higher velocity and then immediately from a higher to a lower velocity as it flows from the bottom of one member of the agitator-extractor into the bottom of the next member. These changes of velocity generate whirls and eddies that thoroughly intermix the oxygen with the pulp, inducing the most energetic and complete solvent action of the cyanid on the gold. These eddies and whirls also scour and clean the agitator-extractor at the points most liable to clog. The aforesaid construction of the agitator-extractor in pipes or leaves renders it possible to get a great length in a small area of floor-space, and thus to readily keep the ore particles in suspension in the solvent in the presence of the oxygen for any desired length of time, since, the other conditions being the same, the length of time depends on the total length of the agitator-extractor. From the agitator-extractor (where the solution of all the gold by the cyanid is practically completed) the pulp goes by pipe $r$ to any suitable filter or separator S, and which is preferably my centrifugal filter-separator, which is described and claimed in another application for United States Patent. Here the solution containing the dissolved gold is separated from earthy base mineral matters and goes to a vat T by pipe $t$. A pump U draws the solution from said vat T and forces it by pipe $v$ to the vat V, whence it flows by gravity to the electrodeposition-bath W, containing suitable anode and cathode plates, and connected with an electric generator. This bath may be of any suitable construction, but is preferably of that described and claimed in my other application for United States Letters Patent relating thereto. In passing through this bath more or less of the gold is deposited on the cathode-plates. From the bath the solution, usually still containing some gold, goes to the regenerating cyanid-vat X, where a suitable additional quantity of potassium cyanid is received by it, and thence into the conveyer-mixer G, where it receives an additional quantity of powdered ore. Thence the pulp proceeds through the apparatus as before, and thus in continuous orderly succession. The refuse from earthy and mineral matter from the separator S, still containing cyanid solution, is taken from the separator to the filter-press Y, the solution expressed and turned into the vat T, and the remaining worthless mass disposed of. This continuous process insures great economy of labor and material and saving of time. It also materially increases the percentage of extraction in the bath, since I find that there is no deposition of gold on the the cathodes until after a certain percentage of gold has been dissolved by the cyanid. I term the solution in this condition a "saturated" solution, and once it is saturated practically all the additional gold taken up in the successive rounds of the pulp through the apparatus is deposited.

It is of course to be understood that the various parts of the apparatus will be constructed of such materials as will not be injuriously acted on during the operation of the process.

Now, having described my process, I claim as my invention—

The continuous process of treating ores of precious metals hereinbefore described, and consisting in mixing the finely-divided ore with a suitable solvent for the precious metals, inducing the mixture to flow continuously from and back to the point of admixture, while so flowing introducing liquid oxygen or liquefied air into the mixture, then causing the mixture to flow with sudden variations of velocity to agitate it, then separating the solution from the base earthy mineral matter, and sending it continuously through an electrodepositing-bath, where the precious metal is deposited, and thus in continuous ordered succession.

In testimony whereof I have signed my name hereto, in the presence of two subscribing witnesses, this 15th day of January, 1900.

HARALD DE RAASLOFF.

Witnesses:
HENRY N. BROWN,
BERNARD J. ISECKE.